United States Patent [19]
Gorman

[11] 3,982,602
[45] Sept. 28, 1976

[54] AUTOMOBILE ANTI-THEFT DEVICE
[75] Inventor: Jonas Gorman, Bayside, N.Y.
[73] Assignee: Lawrence Peska Associates, Inc., New York, N.Y. ; a part interest
[22] Filed: Feb. 12, 1975
[21] Appl. No.: 549,344

[52] U.S. Cl............................. 180/114; 74/558.5; 150/52 M; 220/1 V
[51] Int. Cl.² ....................................... B60R 25/02
[58] Field of Search............ 180/114, 82 R; 74/558, 74/558.5; 150/52 M, 52 K; 220/1 V; 280/150 R, 87 R

[56] References Cited
UNITED STATES PATENTS

| 574,755 | 1/1897 | Ochler | 74/588.5 X |
| 3,462,982 | 8/1969 | Moore | 180/114 X |
| 3,629,818 | 12/1971 | Hirama | 180/114 X |

FOREIGN PATENTS OR APPLICATIONS

| 684,481 | 11/1939 | Germany | 74/558 X |

Primary Examiner—M. H. Wood, Jr.
Assistant Examiner—John P. Silverstrim
Attorney, Agent, or Firm—Jack D. Slobod

[57] ABSTRACT

A housing for preventing access to the steering wheel of an automobile. The housing is contoured generally in the form of a truncated cone having a generally cylindrical collar disposed at the small end thereof. Extending across the large end of the truncated cone is a generally planar member. Disposed within a plane which extends through the axis of the cone is a hinge for selectively opening the housing for access to the interior.

3 Claims, 5 Drawing Figures

AUTOMOBILE ANTI-THEFT DEVICE

BACKGROUND OF THE INVENTION

The invention relates to automobile equipment and particularly to anti-theft equipment for automobiles. The prior art includes various interlocks for preventing movement of an automobile steering wheel. Such apparatus in general provided an interlocking member which engages a portion of the steering wheel under some predetermined condition. The predetermined condition may be for example, when the ignition key is off and the transmission is in the neutral or park position. Such structures have not been sufficiently effective to deter automobile theft other than by a youth who may be merely interested in a short ride.

It is a primary object of the invention to provide apparatus which will substantially decrease the likelihood of the theft of an automobile.

It is another object of the invention to provide apparatus which is visible from the exterior of the car and which when installed will make it apparent to someone outside the car that the theft of that particular vehicle will be substantially more difficult than other vehicles.

Yet another object of the invention is to provide apparatus which may be easily and inexpensively installed on existing automobiles.

An additional object of the invention is to provide apparatus which is simple and inexpensive to manufacture.

SUMMARY OF THE INVENTION

In accordance with the invention a housing is provided having the general contour of a truncated cone. A generally cylindrical collar is disposed as the small end thereof which is dimensioned and configured for snug fitting engagement with the steering column. A generally planar member is disposed at the opposite end thereof in generally perpendicular relationship to the axis of the truncated cone.

The housing is formed in two pieces having the same general contour and which join along lines which are each within a plane which extend through the axis of the truncated cone. A hinge is provided along one side for pivotal motion of the halves of the housing and a hasp is disposed along the other side in one form of the invention for securing the housing together with a padlock.

BRIEF DESCRIPTION OF THE DRAWING

The invention will be better understood by reference to the accompanying drawing in which.

DESCRIPTION OF THE PREFERRED EMBODIMENT

Figure 1:
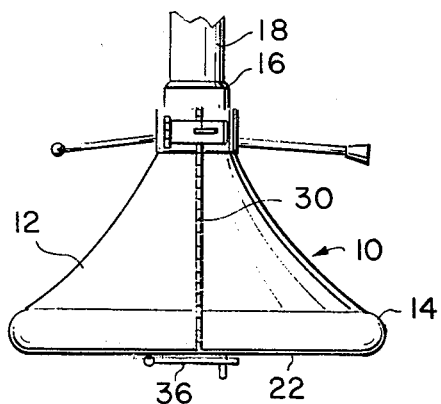
FIG. 1 is a plan view of one form of the apparatus in accordance with the invention.
Figure 2:
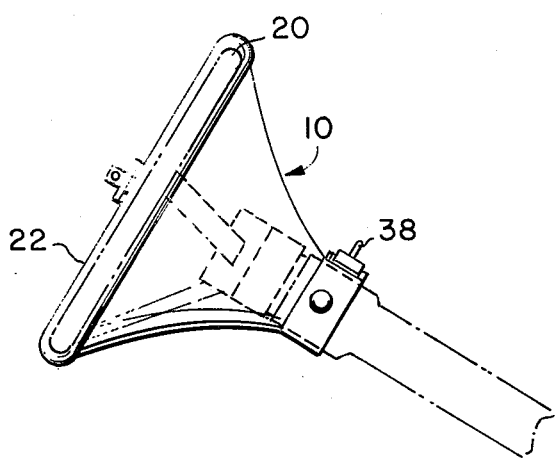
FIG. 2 is a side elevational view of the apparatus shown in FIG. 1.
Figure 3:
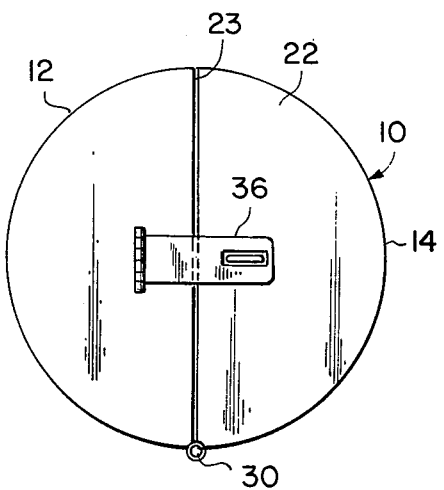
FIG. 3 is an end elevational view of the apparatus shown in FIG. 1.
Figure 4:
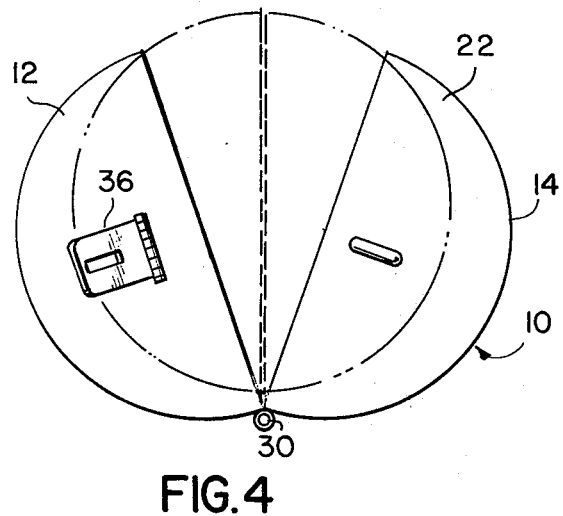
FIG. 4 is an end elevational view similar to that of FIG. 3 showing the pivotal motion between the halves of the housing about the hinge.
Figure 5:
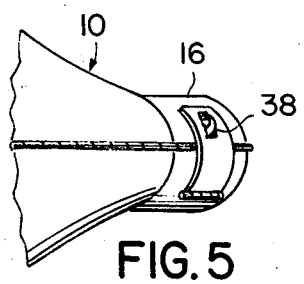
FIG. 5 is a broken away elevational view of a portion of the apparatus shown in FIG. 1.

Referring now to FIGS. 1 through 5 there is shown a housing 10 having a generally truncated conical contour. The housing is formed in two halves 12, 14 having a separation along a line which is within a plane extending through the axis of the housing 10. Disposed at the axial extremity of the truncated cone which is smallest is a collar 16 which is dimensioned and configured for snug fitting engagement with the steering column 18 with the truncated conical housing 10 disposed about the steering wheel 20 of an associated automobile. Carried across the larger axial extremity of the truncated cone is a generally planar top 22. Disposed along the separation line 23 between the halves 12, 14 of the truncated conical housing 10 is a hinge 30. Carried along the mating surface of the truncated conical housing are hasps 36, 38 for selectively securing the housing 10 about the steering wheel.

The housing ordinarily will be constructed of a metal and ordinarily that metal will be steel since the strength of the apparatus is particularly important.

Having thus described my invention, I claim:

1. A housing device for enclosing the steering wheel of an automotive vehicle to prevent access to said steering wheel, said housing comprising: a truncated generally conical shell defining relatively large and relatively small diameter opposite ends, said large diameter end being configured for encompassing the rim of said steering wheel, said small diameter end terminating in a collar configured for snug fitting engagement about the steering column of said vehicle, said housing being formed in two halves with a parting line disposed in a plane extending through the axis of said shell, hinge means disposed on one side of said shell along said parting line for coupling said halves for relative swinging movement to enable placement of said shell about said steering wheel, and first and second locking means respectively carried by said large diameter end and said collar for selectively securing said halves together to form said shell.

2. The device of claim 1 wherein said first and second locking means respectively comprise first and second hasps for extending across said parting line.

3. The device of claim 2 wherein said large diameter end of said shell has a generally planar end wall, said first hasp being carried by said end wall.

* * * * *